Figure 1:
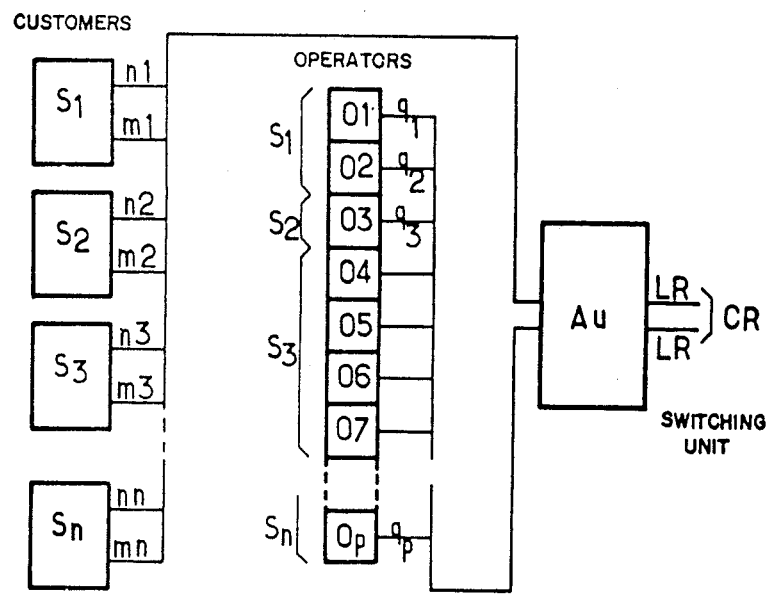

United States Patent [19]
Morgand et al.

[11] 3,944,751
[45] Mar. 16, 1976

[54] TELEPHONE PRIVATE BRANCH EXCHANGE SYSTEM

[75] Inventors: Pierre Morgand, Morsang-sur-Orge; Yves Riou, Paris, both of France

[73] Assignee: Compagnie Industrielle des Telecommunications Cit-Alcatel, France

[22] Filed: June 18, 1973

[21] Appl. No.: 370,695

[30] Foreign Application Priority Data
June 16, 1972 France.............................. 72.21890

[52] U.S. Cl............................................ 179/27 CA
[51] Int. Cl.² ........................................ H04Q 3/58
[58] Field of Search....... 179/18 AD, 27 CA, 18 BD

[56] References Cited
UNITED STATES PATENTS

| | | | |
|---|---|---|---|
| 3,115,552 | 12/1963 | Fulwiler et al. ................. | 179/18 BD |
| 3,180,941 | 4/1965 | Williford ......................... | 179/27 CA |
| 3,180,942 | 4/1965 | Matthews ......................... | 179/27 CA |
| 3,268,669 | 8/1966 | Vigliante et al. ................ | 179/27 CA |
| 3,306,983 | 2/1967 | Goodwin et al. ............ | 179/18 BD X |

Primary Examiner—William C. Cooper
Attorney, Agent, or Firm—Craig & Antonelli

[57] ABSTRACT

Telephone automatic switching unit for semi-public use, serving private subscribers and permitting communication by at least a portion of the subscribers via the public communication network by either direct connection of the network, or by means of operators, the subscribers being associated with either one or several different enterprises. The automatic switching unit includes a connecting network, a central control member or a processing unit, registers, senders, and incoming and outgoing circuits for providing communication between subscribers as well as connection with the public network.

7 Claims, 3 Drawing Figures

TELEPHONE PRIVATE BRANCH EXCHANGE SYSTEM

The present invention relates to a semi-public automatic telephone switching system, such as a private branch exchange, placed at the disposal of one or several users in one and the same unit area constituting one and the same property or co-property, the number of users being generally unknown at the time of the construction of the installation and especially susceptible to change considerably after the beginning of operation.

Examples of such installations are known. They are furnished, for example, by high-rise buildings or other large building units, the premises thereof being placed at the disposal of one or several large industrial organizations, either public or private. In such cases, the number of telephones or stations per floor or per company is susceptible to vary within very wide limits according to the degree of occupancy of the buildings and according to the need of the users. Therefore, it is not possible to install at the very outset of building construction or occupancy several distinct automatic switching units because neither the number of users nor their relative importance are known at that time. It is also necessary to take into account the future fluctuations of the installation, for example, that several companies may be replaced by a single one, or vice-versa, or that certain companies may sublet a part of their premises.

As is known, only one automatic switching unit is constructed per building, or per unit or group of attached buildings, which on the one hand can serve for communication between any two subscribers of a same company, or different companies, and which, on the other hand, can be connected to the public communication network both for outgoing and incoming calls.

In the case of an outgoing network communication, the caller can obtain his correspondent either by direct connection through the network, or by means of an operator depending upon the category into which he falls. Therefore, it is advisable that each company have its own operators who know the internal organization thereof.

In the case of an incoming network communication for which the user being called does not pay charges, it is logical, continuing this line of reasoning, to envisage the direct generalized selection of the subscriber being called without operator interposition. This procedure thus allows for a reduction of the number of operators, and consequently of the administrative expenses charged to each company.

U.S. Pat. No. 3,534,173 describes an automatic switching system of the cross bar type, with centralized control, having conjugated integral selection, which is usable practically without upper capacity limit. In this system, one of the objects of the invention has been to reduce the number of members necessary to assure a specific traffic between subscribers, whether directly connected to the exchange or not. One of the characteristics of the system resided in the formation of a control image network which, supplied or energized at the two ends thereof between caller and party upon the command of a centralized member, furnished all the paths available for connecting these ends, and in fact that appendant members, identifying means, readers, and notifying means allowed for determining the available path in the different stages. Another characteristic of such system consisted in that between the group of calling subscribers and the group of subscribers being called, there was installed only one double selecting stage, one side of the stage being connected to the caller, and the other side of the stage being connected to the party being called, and the two sides of the stage being known when the selecting means is engaged, and each vertical access to a group of subscribers being used for the search of the caller as well as that of the party being called.

The general aim of the present invention consists in a reduction of the costs of investment for each user and in the reduction of the administrative expenses charged to each company, while still maintaining a certain personalization thereof. The system according to the present invention has the following characteristics:

an automatic switching unit common to several uses;
a generalized direct selection at the incoming line of the subscriber being called;
outgoing network lines common to the unit or entire group of users;
a centralized telephone charging system;
the assignment of operators per company; and
the mutual interdiction between companies of access to the specialized connections.

Furthermore, the generalized direction of the system is obtained or realized from a central memory with integrated circuits of great capacity in a manner such as to treat or handle the entirety of the discriminating problems of the telephone stations. The subscriber lines are equipped with two wires plus one control wire for call back and transfer operations to be initiated from a button situated on the telephone or station. The circuits designed for interlinking with the central exchange can be handled at the central exchange, either as subscriber lines, or an junction lines. They are accessible to the local subscribers and to the operators.

The operators may initiate a call by using a prefix or code with 1 or 2 numbers or digits unique for the group or entirety of users, but which allows in each company the obtaining the operator and/or operators assigned to this company. The direct connection of an outgoing network line or a specialized linkage is obtained from either a prefix or code of 1 or 2 numbers or digits, or by numbering or dialing with several numbers or digits integrated in the national numbering or dial system. The telephones or stations are equipped with either a touch-tone system or a dial system and are divided into several categories according to their possibilities of reaching either a portion of or the entirety of the public network. Moreover, they may have a large number of possibilities of special uses such as the abbreviated dialing, the search of malicious calls, the search for persons, filtering, call forwarding, repertoire dialling, and the reverting call.

The automatic switching unit according to the present invention may be the sole one in the installation connected to the public network; it then serves locally from 400 to 30,000 subscriber lines and comprises the necessary junctions with the central exchange. The automatic switching unit according to the present invention may also be part of a private network where several automatic switching stages are interconnected. The number of local subscribers may vary from 400 to 30,000 and the number of switching circuits of the incorporated nodal center may attain 800 so as to assure the interconnection.

The equipment of the automatic switching unit may be classified into three categories;
- the equipment constituting the connecting network;
- the equipment serving or supplying this connecting network; and
- the equipment of the ends such as end cables, cable terminals, and cable distribution heads or the like.

The connecting network may comprise two or three selecting stages, a subscriber stage, a connection stage, and a third stage consisting of groupings of secondary selectors. The third stage whose purpose it is to enlarge the selecting field exists only if the number of the exterior junctions justifies it. The equipment serving the connecting network is categorized for reasons of economy of material into two categories - members assuring the slow operations and members assuring the rapid operations. Into the first category are placed all the apparatus whose functioning or operation depends upon noncontrollable causes, for example, registers or recorders, senders and like apparatus. Into the second category are placed the apparatus whose information or data to be received which can be immediately communicated, for example, a processing unit, translator modulator, or like apparatus. The end equipment consists of the peripheral members upon which there are connected or joined the circuits, which are essentially the incoming junction means and the outgoing junction means of the network lines and, in certain cases, junction means of specialized lines toward private installations.

In a semi-public or private branch exchange such as that according to the present invention, the subscriber stations or a part of the subscriber stations having available call back and transfer controlled from the station may be successively in touch with the network junction means and with a subscriber station taken as a call back or for transfer. There is the need for a second linkage between the junction means and the last selecting stage in order to assure the transfer function or operation. This second linkage constitutes one characteristic of the automatic switching unit according to the present invention.

The present invention may further include perferably at least one of the following characteristics:
- the incoming junctions means are connected to a register or recorder by means of a line selector;
- the outgoing junction means are equally connected to a number receiver or to a sender by means of a line selector;
- the register and/or sender being chosen may be attached to a specialized auxiliary member by means of an auxiliary line selector;
- the outgoing network lines may be associated with a charge evaluating means, or be equipped with a system for transforming charge information or data received from the connected central exchange;
- in the case where several exchanges are integrated in one private telecommunication network, a nodal center or exchange is incorporated with the automatic switching unit, which assures the interconnection of the private centers or exchanges;
- the nodal center or exchange consists of outgoing, incoming, or mixed junction means feeding the private junction means, one or several stages of secondary selection, and an assembling stage;
- the connecting network may assure the feed of two-wire and four-wire circuits by joining together between themselves the two-wire circuits or the four-wire circuits, or by joining the two-wire circuits to four-wire circuits;
- the ordering means is common to the totality of the exchange and handles all types of communications; and
- the incoming or outgoing junction means being adapted to the codes of the private network may include a terminating circuit-balancing network for the passage of two wires into four wires, and attenuation cells for the adaptation of the outgoing, transit, or incoming communications to the regulation of the circuits of the private network.

Figure 2:
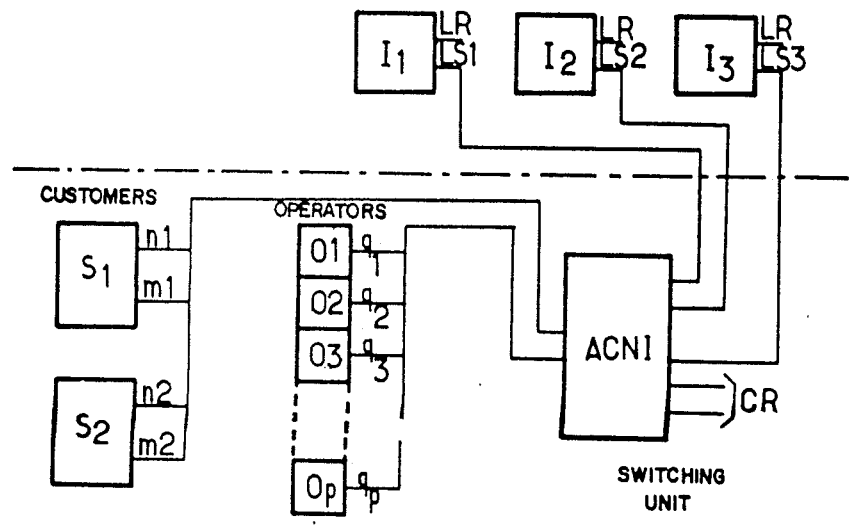
Figure 3:
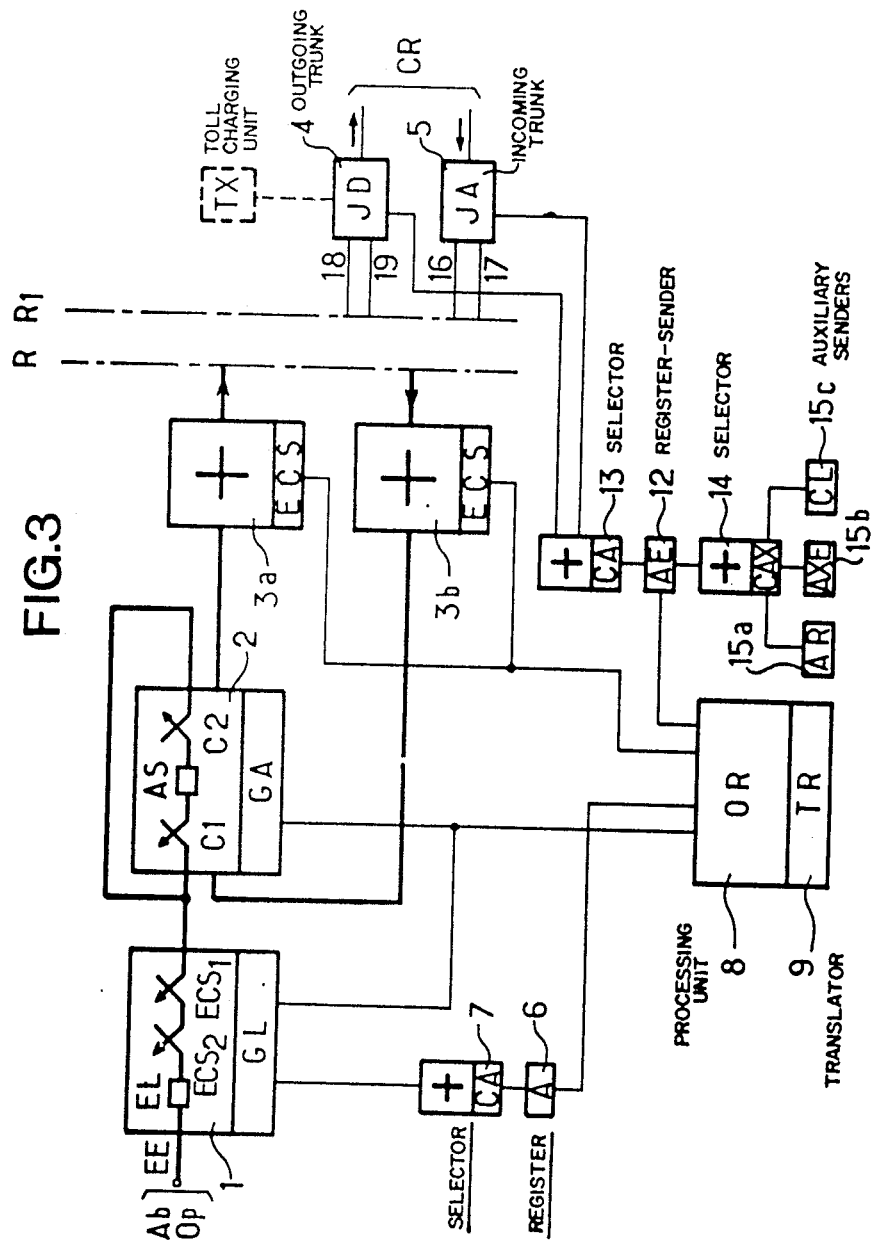

These and further features, objects and advantages of the present invention will be more fully understood with the aid of the following detailed description, given by way of example, and taken in connection with the accompanying drawings, wherein FIG. 1 is a block diagram of a system installation in accordance with the present invention without an incorporated nodal center;

FIG. 2 is a block diagram of a system installation in accordance with the present invention with a nodal center incorporated therein, and FIG. 3 is a schematic block diagram of an automatic switching unit or auto-commutator according to the present invention.

It is assumed, by way of example, in FIG. 1 that a certain number of different companies S1, S2, S3 . . . Sn make use of the same automatic switching unit Au. The automatic switching unit serves for connecting with each other by means of numbering or dialing with 4 or 5 numbers or digits any two subscribers of one and the same company by means of linkages $n1, n2, n3 \ldots nn$. The linkages between subscribers of different companies attached or connected to the same automatic switching unit Au may also be obtained by dialing 4 or 5 numbers or digits without connection through the public connecting exchange CR. The subscribers of each of the companies, or only a part of the subscribers, may have access, through the automatic switching unit Au, to the public network by means of the central exchange CR, but they may have access thereto in two different ways according to the category of stations to which they are assigned, namely, either by means of the direct tapping of the public network (linkages $n1, n2, \ldots nn$), or by means of operators (linkages m1 for company S1, linkages m2 for company S2, linkages mn for company Sn). The call of an operator is made for the subscribers of each company by dialing a conventional number of 1 or 2 digits. This call is thus made by means of the automatic switching unit Au. Assigned to each company is a certain number of operators, for example operators 01 and 02 to company S1; operator 03 to company S2; operators 04 to 07 to company S3 . . . The operators are connected to the input of the automatic switching unit Au by linkages $q1, q2, q3 \ldots q9$ analogously to the subscribers equipped with the direct tapping or connection of the network. the unit Au is thus unique for feeding the subscribers of several distinct companies, and for giving them access to the public network by the same bundle of network lines LR. The communications of the network at the incoming side are made without the intervention of operators, directly on the station being called, by the use of the unit Au, the bundle of network lines LR at the incoming side being much less than the total number of subscribers of the different companies.

FIG. 2 envisages by way of example another type of installation of a private network composed of several installations I1, I2, pertaining to company S1; I3 pertaining to company S2, which may be interconnected with corresponding or sister companies only by means of an automatic switching unit ACNI at the incorporated nodal center. Each of the installations I1, I2, I3 . . . represents an arrangement of the type disclosed in FIG. 1, but furthermore comprises a certain number of linkages LS1, LS2, LS3 connected with the unit ACNI. The linkages may be entirely private if they are in the same enclosure as ACNI, or they may consist of circuits leased to the public administration if they are outside of that enclosure.

The unit ACNI may then play a triple role vis-a-vis the installations I1, I2 and I3:

either as an outgoing center vis-a-vis a subscriber of company S1 or company S2 toward the installations I1, I2 for S1 and I3 for S2;

or as incoming center vis-a-vis a subscriber of an installation I1 or I2 or I3 wishing to communicate with a subscriber of company S1 for I1 or I2, or with a subscriber of company S2 for I3;

or as transit center vis-a-vis a subscriber of I1 for example wishing to communicate with a subscriber of I2. Evidently, as in the case of FIG. 1, a subscriber of S1 or of S2 may have access to the public network by means of the connecting center or exchange CR. This access may be realized either in direct tapping of the network, or by means of an operator.

FIG. 3 is a schematic block diagram of the switching unit (Au) according to the present invention in the case corresponding to FIG. 1. The connecting network properly speaking comprises all the members which assure the continuity of the line and its branching of the caller toward the party called. It consists of either two selecting stages 1 and 2, or of three selecting stages 1, 2 and 3a/3b, according to the capacity of the exchange. The subscribers Ab and the operators Op are connected to the inputs EE of the first selecting stage 1, also called the subscriber stage. The subscriber stage is divided into subscriber groups or local groups (GL) and each group of subscribers comprises several selecting or selection units. One selecting unit comprises three cross-bar switches, one switch ECS1 and two switches ECS2. The subscribers are connected to the horizontal lines of the switches ECS2. One crossbar switch comprises 10 vertical lines with 20 outputs each; the group of subscribers thus feeds 400 subscribers. It is apparent that the twenty vertical lines of the switches ECS2 (a vertical line is represented with an arrow, while the horizontal line does not contain one) are connected the twenty horizontal lines ECS1. The lines of the subscribers Ab are each equipped with a line implement device EL having a call, cut-off, and error relay. The operators Op are considered priority subscribers at heavy traffic or at peak business loads or times and are connected to a particular selecting unit.

The vertical lines of the switch ECS1 are connected to the horizontal lines of a switch C1 of the second selecting stage, also called the assembling or connecting stage 2. The assembling stage 2 is composed of assembling groups GA whose quantity is fixed or determined by the calculation of members. Each group itself is composed of two racks or bays C1 and C2 each comprising 10 crossbar switches, and of either one or two assembling racks or bays AS. According to or depending upon the type of communication to be established, the assembling racks or bays are constituted differently; the wiring of the racks or bays is arranged in such a manner that it is possible to place a rack or bay support any type of assembling means whatsoever. The assembling means which allow for the feed of the incoming network, outgoing network, and transfer communications require the use of a single relay. The energization or supply functions of the caller or of the party being called, and the analysis of the line signals are reported or transferred into the end or terminal members.

The third selecting stage 3a–3b or stage ECS consists of groupings of secondary selectors. Grouping 3a used in the outgoing direction, and grouping 3b is used in the incoming direction. Each grouping of secondary selectors is obtained either by one or by two crossbar switches whose 20 outputs of each vertical line are multiplied point by point. Thus obtained are groupings with 10 or 20 inputs and 20 outputs. The selection grouping 3a is connected over the horizontal lines of the switches C2 while the grouping 3b is connected over the horizontal lines of the switches C1. The function of the secondary selector stage is that of increasing the field of selection of the assembling groups GA. On the output levels of the ECS switches there are connected automatic circuits which are incoming or outgoing toward the private installations I1, I2, I3, including outgoing network lines JD and incoming network lines JA toward the public exchanges. The sole restriction is to assign a given grouping of ECS switches to a category of lines, or previously mentioned circuits. A charge evaluating means TX may be associated with each outgoing junction means JD in order to determine the charge for each communication.

The three selecting stages 1, 2 and 3a/3b which have been described hereinabove constitute the connecting network properly speaking. The feed of the connecting network is made by means of attendant members which may be classified into two categories:

members having slow operations such as registers and senders, members having rapid operations such as the processing unit and the translator.

Registers 6 are placed at the disposal of the calling subscribers by means of selectors 7. These registers are reserved essentially for reading in the memory thereof or registering the numbers or digits composing the number of the subscriber being called. They are connected to the subscriber lines through the line selectors 7 and by means of the switches ESC1 and ESC2. The registers emit a dial tone before recording the number of the party called and are equipped, in the case of wrong manipulating by the caller (incorrect dialing of calls, incomplete numbers), to connect the subscriber to the error equipment EL which assures the sending of the busy signal. These registers are of the decimal type, but may be associated, in the case of subscribers with touchtone sets, with an auxiliary member allowing for the reception of the touchtone dialling at voice frequency. Reference numeral 12 (AE) designates a register-sender.

The register-senders 12 (AE) are fed or supplied by a double stage of line selectors 13 for the purpose of relating the outgoing network lines 4 and the incoming network lines 5. They are used for the incoming network communications and for the transfer communications. They are of the decimal type, but it is possible to adjoin thereto, very easily, by means of an auxiliary line selector 14 (CAX), an auxiliary reception member of the desired code, for example, 15a (AR) for the reception, of the multi-frequency code, or for the reception of the code R2.

The registers have a memory capacity of 10 figures or digits; this capacity may be increased if need be. In the case of outside networks with direct dialing, one or two digits may be put in memory in the junction means of the incoming network line, these digits then being transferred into the annotator. When all of the digits are received in the annotator, the latter transfers them into the processing unit OR which establishes the communication with the subscriber being called. The register-sender 12 (AE) are equipped with decimal emitters. They re-emit the number of the party being called for the outgoing communications when the signaling with the central exchange CR is a recorded signal. They are adapted to the code used on the outgoing junction means. They are placed behind a stage or line selectors 13 (CA) and put in relationship with the junction means 4 (JD) of the outgoing network lines. They receive their information or data from the processing unit 8 and from the registers 12. They emit or signal in decimal code, but it is possible to adjoin thereto auxiliary members 15b (AXE) emitting or signalling on another code (code R2, multifrequency code), or 15c (CL) for the touch-tone emission at vocal frequency by means of the line selector 14 (CAX). The emitters release the pick-up or connection pulse toward the distant exchange, and after receiving the invitation to transmit, send the number having been called to the intake or arrival recorder or register of the distance exchange. After reception of the end of selection signal emitted by the distant exchange (subscriber either free or busy), they connect the outgoing junction means in conversation position if the subscriber is free, or they free the outgoing circuit and the established chain if the subscriber is busy. The local caller is returned onto his error relay which assures the sending of the busy signal. The emitters AE are also used in the transit communications of an incoming path on an outgoing path, for example in the case of an incorporated nodal center or exchange according to FIG. 2.

The processing unit 8 (OR) assures the rapid operations which are the acknowledgement of a number being called; its analysis; establishing of a communication of whatever nature (local, outgoing, incoming, transfer of the number being called to an emitter, determining the value of the charge to be communicated to a charge-evaluating means associated with an outgoing network line), analysis of the discriminations of the subscribers calling and being called with, as a consequence, either the establishment of the communication, or the return to the error relay of the caller, on special services, or on a recording apparatus.

The processing unit OR is connected with an electronic translator or converter 9 (TR) whose essential role consists in giving the instructions for the routing of the communication according to the number of the party being called, transferred from an annotator into the ordering unit means. These instructions consist in indicating the group of subscribers which is affected, or the outgoing direction, the number of digits, and, if necessary, the nature of the digits to be retransmitted over a distance. If the lines relative to the path of first choice are totally occupied, or busy, the translator or converter indicates the overflow path to be used. A single ordering unit means may supply the entire exchange, but a second ordering means may operate in parallel, as a security measure.

The end or terminal equipment for the outgoing junction means 4 (JD) and the incoming junction means 5 (JA) are connected by means of a current distributor RR1 respectively either onto the levels of 3a (ECS) or 2 (C2), or the levels of 3b (ECS) or 2 (C1).

The incoming network lines 5 divert or branch the traffic from the central exchange CR. In the case of network lines from the exchange not equipped with recorders or registering devices, the junction means JA are conceived for recording one or two digits during the time necessary for the connection of a register-sender 12. The recorded digits are thereafter retransmitted by a marking path to the chosen annotator. The junction means JA are adapted to the signaling utilized in the connecting exchanges, and allow for the energization or supply of the station of the subscriber being called. The subscriber who is called has the possibility of transferring the network communication to another station and the junction means JA is connected by the linkages 16 and 17 to the two different inputs of the stage 3b (ECS) or stage 2 (C1) if there is no stage ECS, in a manner such as to be able to assure the transfer function or operation. Due to the command of the subscriber who may wish to transfer the communication, the equipment JA puts the outside line on hold, and proceeds with calling vis-a-vis a register-sender 12 which records or registers the request and will signal the processing unit 8. The latter connects the junction means to the new subscriber being called. The operation of hanging up of the first subscriber causes freeing of the line thereof.

The outgoing network lines 4 branch or divert the traffic with the destination of the central exchange CR. If the code of data with the central exchange requires a signalling or recorders or registers, the outgoing network line equipment (JD) is associated with a register-sender (12) which will exchange signalling with the distant recorders. The equipment JD supplies the calling subscriber. The latter has the possibility, at any instant of the communication, to transfer the communication with the network to another subscriber. The equipment JA is thus connected by linkages 18 and 19 to the two different inputs of stage 3a (ECS) or stage 2 (C2), if there is no stage ECS, in such a manner as to be able to assure the double function or operation of call and transfer. Due to the command of the subscriber desiring the transfer, the junction means JD puts the outside line on hold and proceeds with signalling vis-a-vis a register-sender 12 which registers the request and signals the processing unit 8. The latter connects the junction means JD to the new subscriber. Hanging up by the first subscriber causes freeing of his line. The outgoing network line may be associated with a charge-evaluating means and the exchange may also be equipped with a centralized electronic charge center.

The automatic switching unit proposed by the present invention may also have a two-wire or four-wire incorporated nodal center or exchange in order to assure the interconnection between installations in the arrangement of FIG. 2. The nodal center or exchange consists of outgoing, incoming or mixed junction means. The connecting network may assure the supply of two-wire or four-wire circuits by joining two-wire or four-wire circuits together between themselves, or two-wire circuits to four-wire circuits. The ordering unit means is common to the entirety of the exchange and handles all types of communications. The incoming or outgoing junction means adapted to the codes of the private network may comprise a terminating balancing network for the passage of two wires into four wires and attenuation cells for the adaptation of the outgoing communications, transit or incoming communications to the regulation of the circuits of the private network.

The memory with integrated circuits which is incorporated in the processing unit allows for obtaining a large number of particular discriminations or options both in the categories of stations having access to the network and in the possibilities of use. It is therefore extremely flexible and authorizes practically any particular request.

By way of example, a nonlimitative list is given hereafter of the possibilities which exist, or are given, to the subscribers upon request. On one and the same switching unit according to the present invention it is possible to connect at the same time stations operating in the dial system and those having a touch-tone system in any desired proportion. The sound of dialing or the calling rhythm is different depending upon whether it is a question of an inside or outside call.

In the case of a switching unit serving only one company, the number of categories of stations for accessibility to the network and to the outgoing linkages include the following:
1. private station,
2. private station having access in outgoing calls to the interautomatic lines,
3. private station having access in incoming calls to the public network,
4. controlled station or with indirect connection (outgoing network by means of operators),
5. station with direct connection of the public network (only urban network),
6. station with direct connection of the public network (only regional network),
7. station with direct connection of the public network (general network),
8. categories in reserve, possibly used for the transmission of data.

When the switching unit serves several companies, one will discriminate the company to which the station belongs so as to limit the total number of categories.

Moreover, the internal options include the following:
1. dial or touch-tone station,
2. call forwarding,
3. conference,
4. abbreviated numbering or dialing,
5. group hunting,
6. malicious calls,
7. reverting call (re call of caller),
8. automatic repetition of number,
9. recording or registering service,
10. appointment call,
11. executive right of way,
12. research or investigation of persons.

All of the options relative to each station are recorded in the translator or converter; they are modifiable without intervention on the wiring with the aid of a command desk by a person having the responsibility of the telephone service. Likewise, translation tables give the correspondence between the equipment number and the telephone directory number of each station, these table being changeable by the same process described above. Accordingly, the problem of the mutations and changes in the discrimination of stations inside the installation is resolved easily and rapidly.

Given hereunder are the definitions relative to the options enumerated hereinabove on the services assured by the switching unit according to the present invention.

Call back and transfer: The call back allows for a user to put a correspondent momentarily on hold so as to communicate with a third one, an for then resuming his conversation with the first correspondent or caller. In the case where the user hangs up the set, he puts in touch his two correspondents, thus effecting a transfer. Call back and transfer are carried out as well in internal communication as in outside communication. For stations with the dial system, the call back is controlled at the dial by emission of a prefix (the line connected to the station will then be a two-wire line). For stations with touch-tone, the call back is controlled by the eleventh and twelfth touches or keys of the key assembly with a line having two wires.

Call forwarding: While preserving the use of his station for outgoing calls, the user may cause the return or discharge of calls which are destined for him toward a station of his choice. For this purpose he composes from his station a prefix followed by the number of the station upon which he makes his return.

Conference: It is possible to establish a conference either between three stations or between two stations and a network. When the caller hangs up, the connections are interrupted under the usual conditions, whereas hanging up of one of those called will still leave the other two users normally connected. The number of stations having a right to this serive is not limited. However, according to the capacity, the switching unit is provided for 8 to 32 simultaneous conferences between three parties. A more significant number of simultaneous conferences would involve an increase of traffic.

Abbreviated numbering or dialing: The abbreviated numbering or dialing allows to a user to obtain a certain number of subscribers internal or Postal and Telecommunication Services by composition of a number with two digits.

Group Hunting: A station equipped with such a device may cause itself the temporary grouping of its line with that of a station of its choice in such a manner that, when it is busy, the calls formulated under its number reach the designated station.

Malicious calls: The user of a station may, after having received a call, accede to a device which allows him to identify the origin of the call by blocking the chain.

Reverting (re call of the caller): A station may memorize a called number in case the latter is busy and receive a sound signal after freeing thereof.

Automatic number repetition: Certain stations may have at their disposal a system of automatic repetition of the number called in case of no previous result. In the case of local communications, a station may memorize a called number in case the latter is busy and receive a sound signal after it is free.

Recording service: Certain users have the possibility of having their communications recorded on magnetic tapes by cuasing to intervene as a third party a common recording service and to later cause reading thereof from their station.

Appointment call: After composition of a prefix and of the hour of the appointment, the user is automatically informed at the desired hour by the recorded disk.

If the user does not answer after 20 seconds, the call is annulled.

Executive right of way: Privileged stations are supplied by the operators with priority. The priority call is distinguished from an ordinary call, at the level of the operator position, by a luminous signal in addition to the numerical posting of the caller number. Privileged stations may enter into third party conversation on a communication of the station called. The party called, in the course of the communication receives an audible signal advising him that a priority holder is asking for him. He puts the party to whom he is speaking at the time on hold and is then automatically connected to the priority station.

Research or investigation of persons: This procedure is started from any station of the installation whatsoever and from the positions of operators. The calls are made by individual receiver. In order to use such an implement, or such equipment, the user composes a prefix followed by the code number of the person called (his station number, for example). When this latter answers, the caller will be informed and proceed with a transfer when it is a question of an outside communication.

It is understood that the present invention is not limited to the embodiment described and represented herein which has been given solely by way of example. Different modifications may be applied thereto without leaving the scope and framework of the present invention. Particularly it is possible to replace certain elements with equivalent elements, the abovedescribed elements being constructed in a known manner.

We claim:

1. In a private branch exchange providing a multistage connecting network between private subscribers and for providing connection of at least a portion of the private subscribers with a public communication system including a central office by direct connection with the central office or connection thereto by means of operators, the private subscribers being associated with one or several enterprises located in the same general area, the automatic switching unit including processing means for determining the connection path to be provided through said connecting network means and register-sender means, the improvement comprising incoming and outgoing trunk means for connecting a subscriber with said central office, the incoming and outgoing trunk means being connected with a switching stage of the connecting network via two different paths, one of the paths providing a path for utilization by a first subscriber requesting communication with said central office, the other path providing a path for utilization by a second subscriber on a call back by the first subscriber, the incoming and outgoing trunk means further being connected with said register-sender means via a first line selector means connecting the incoming and outgoing trunk means to a first register means for registering the call back number of the second subscriber to assure the connection of the station of the first subscriber to the station of the second subscriber.

2. A telephone switching unit according to claim 1, wherein said register-sender means further includes second local register means connected via second line selector means to line equipment means of a subscriber stage of the connecting network means, the second local register means being also connected to said processing means via a marking path for emitting a dial tone to the caller, for registering the number of the party called, for detecting the occurrence of incorrect dialing and for transferring the number of the party called to the processing means such that the utilization of the processing means is minimized independently of uncontrollable causes due to the calling subscriber.

3. A telephone switching unit according to claim 1, wherein said register-sender means further includes sender means connected with the outgoing trunk means for outpulsing the number of the party called to said central office, said first register means being connected to the incoming trunk means for receiving from said central office the number of the party called.

4. A telephone switching unit according to claim 1, wherein the outgoing trunk means include a plurality of lines arranged for connection with said central office, charge evaluating means associated with each outgoing line for recording charge information received from said central office and for determining the charge for the communication associated with a respective enterprise of the private branch exchange.

5. A telephone switching unit according to claim 1 wherein the incoming and outgoing trunk means each include terminating circuit-balancing network means for balancing the connection of a two-wire and a four-wire system, and attenuating means for regulating the level of communication to the level of regulataion of the circuits of the private branch exchange.

6. In a private branch exchange providing a multistage connecting network between private subscribers and between at least a portion of the private subscribers and a central exchange, the connecting network including at least first and second connecting network stages, the private subscribers being connected with a first connecting network stage, processing means for controlling the connecting network path to be provided for a desired communication, register-sender means for signalling of dial tones and for registering and signalling a called number, said register-sender means including first and second register means and first sender means, the improvement comprising incoming and outgoing trunk means for providing a connection path between the private subscribers and the subscribers of the public communication system, the incoming and outgoing trunk means being connected with a second connecting network stage of the connecting network via two different linkage paths, one of the linkage paths providing a path for utilization by a first private subscriber requesting or receiving connection with central office, the other linkage path providing a path for utilization by a second subscriber for call back by the first subscriber, the incoming and outgoing trunk means further being connected with said register-sender means, a first line selector means connecting the incoming and outgoing trunk means to the first register means for registering the call back number of the second subscriber and to the first sender means, the outgoing trunk means being connected with the first sender means, the first sender means including decimal sender means for signalling and emitting the number of the party called by a private subscriber on an outgoing line to the public communication system, the first register means being connected via the first line selector means with the incoming terminal circuit means for receiving from the central office the number of the private subscriber being called and providing an output indicative thereof to said proceeding means, the processing means determining and ordering a connecting path through the connecting network in response thereto.

7. A telephone automatic switching unit according to claim 6, wherein the connecting network further includes a third connecting network stage, the third stage being connected between the first and second stages, the second stage connected with incoming and outgoing trunk means including one output stage portion and one input stage portion, the third stage providing an output to the output stage portion of the second stage and receiving an input from the input stage portion of the second stage, the processing means being connected with each of the first, second and third stages of the connecting network.

* * * * *